Dec. 16, 1947.  W. H. WILKES  2,432,640
FLARE RELEASING MECHANISMS
Filed Feb. 25, 1946  2 Sheets-Sheet 1

INVENTOR.
WESLEY H. WILKES
BY
Reynolds Beach
ATTORNEYS

Dec. 16, 1947.  W. H. WILKES  2,432,640
FLARE RELEASING MECHANISMS
Filed Feb. 25, 1946  2 Sheets-Sheet 2

INVENTOR.
WESLEY H. WILKES
BY Reynolds + Beach
ATTORNEYS

Patented Dec. 16, 1947

2,432,640

UNITED STATES PATENT OFFICE 2,432,640

FLARE RELEASING MECHANISM

Wesley Harold Wilkes, Seattle, Wash., assignor to Boeing Aircraft Company, Seattle, Wash., a corporation of Washington Application February 25, 1946, Serial No. 649,965

13 Claims. (Cl. 89—1.5)

As a part of the navigation of an airplane, and in particular to determine the amount of drift when over water spaces, it is customary to release a flare which, alighting on the water, offers a stable point of reference. The release of such a signal or flare from most airplanes is a comparatively simple matter, but the release of such a flare from a pressurized cabin aircraft involves problems peculiar to such aircraft. It is not possible to open a passageway through the skin, leading from the pressurized interior to the lower ambient atmospheric pressure, for the pressure within the cabin would be lost through so large an opening as such a flare would require. Moreover, such a device must be simple and require a minimum of manipulation. The present invention is designed to provide means for accomplishing the objects generally indicated.

More particularly, it is an object to provide a chute for the release of flares or other small objects from a pressurized aircraft, in which means are provided for pressure equalization as between the cabin and the chute as a prelude to admitting the flare thereinto, and which then automatically equalizes the pressure as between the chute interior and the exterior atmosphere, doing so before and in order to permit the discharge of the flare from the chute.

Further, it is an object to provide mechanism of this general nature, in which the operations are so simplified that the crew member who is to release the flare need only attempt to open the door leading to the chute, which movement, without further thought or effort on his part, first accomplishes pressure equalization as between the interior and the chute, secures the chute temporarily in flare-receiving position, and then opens the door for the admission of the flare, whereupon, after closure of the door, the equalization of pressure as between the exterior and the chute is automatic and prompt, and the crew member need only effect positive discharge of the flare.

It is likewise an object to provide a flare releasing mechanism for the purposes indicated, which shall be of simple construction, light in weight, and to the greatest extent possible, automatic in operation.

With these and other objects in mind, as will shortly appear, the invention comprises the novel flare releasing mechanism, and the novel combination and arrangement of the parts thereof, both with relationship to each other and to the aircraft structure, all as shown in the accompanying drawings in a preferred form, and as hereinafter described and claimed.

Figure 1:
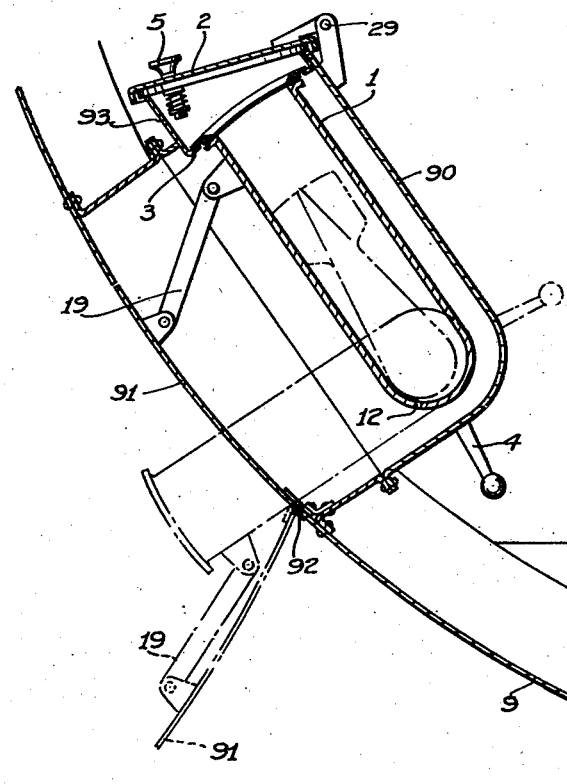
Figure 1 is a section through the aircraft cabin skin and axially through the flare releasing mechanism, showing parts in their normal flare-receiving position in full lines, and in the releasing position in dot-dash lines.
Figure 3:
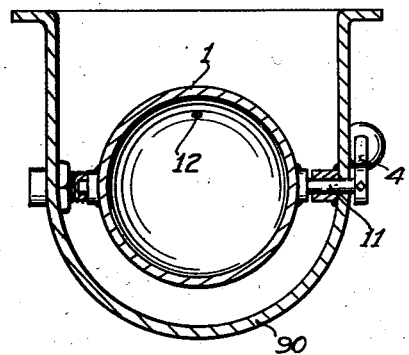
Figure 3 is a section transversely through the pivot mounting of the chute, on an enlarged scale.
Figure 2:
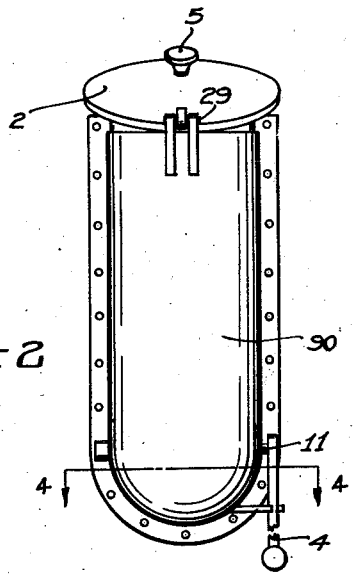
Figure 2 is an elevation of the same as viewed from the interior of the aircraft.

The aircraft exterior skin is illustrated at 9, and this is to be taken as typical only, for the construction may be single construction or double construction, and the particular nature of the construction is immaterial. It will be understood that the interior is to be pressurized by any suitable means. The skin is recessed, as by the provision of a pocket 90, inset interiorly, for the reception of the chute 1, and the indentation formed by the pocket 90 would normally be faired in by a flush cover 91 pivoted at 92. However, reliance is not placed upon the tightness of the closure of the fairing 91 to effect any pressure seal.

Rather, reliance is placed upon the sealing of the door 2, hinged at 29, and seating about its margin at 20 upon an extension 93 of the pocket 90. It is the seal at 20 (see Figures 5 and 6) which prevents escape of pressure from the interior, and it will be noted that the door is so seated that the internal pressure assists in sealing the seat at 20.

Figure 4:
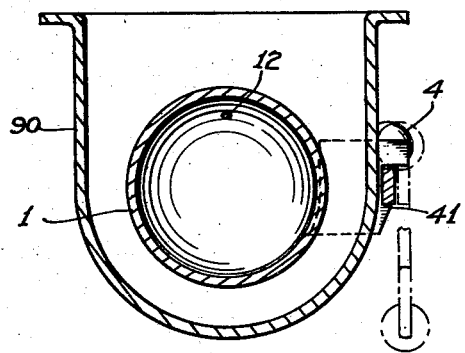
Figure 4 is a similar view along the line 4—4 of Figure 2, illustrating the latching mechanism.

The chute 1, as herein shown, assumes the form of a generally cylindrical tube open at one end and closed at its other end. Its open end is defined by a lip 10, and this lip lies close to a lip 94 of the extension 93. The restricted space between them is in the nature of a bleed port to atmosphere, from the interior of the chute. A sealing ring 3 is supported upon the extension 94, and is normally spaced slightly from the end lip 10 of the chute 1, so that the open end of the chute, if unimpeded, may swing past the lip 94. The chute is pivoted, in this form, upon the axis 11 near its lower end, to be swung under control of the handle 4 from the more or less upright receiving position, shown in full lines in Figure 1, to the downwardly inclined discharging position shown in dot-dash lines in the same figure. Incidentally, it will be noted that a link 19 connects the fairing 91 and the swinging end of the chute 1, so that as the chute swings outwardly the fairing is opened, and vice versa. The handle 4, accessible from the interior of the aircraft, is normally secured within a notch 41 upon the exterior of the pocket 90 (see Figure 4) in order to hold the chute 1 in the normal receiving position, and to prevent accidental downward or releasing movement of the chute.

The chute is preferably also provided with a bleed opening 12. Due to the inherent stiffness of the sealing ring 3, which is of rubber or a substitute therefor, the sealing ring normally stands slightly away from the lip 10 of the chute, to the end that through this bleed opening or through the bleed port 12, or both, the interior of the chute is normally in communication, though somewhat restricted communication, with the exterior atmosphere, and the pressure within the chute corresponds to the ambient pressure. However, before the chute can be opened to the interior for receiving a flare, pressure must be equalized as between the interior of the chute and the interior of the aircraft, and pressure leakage from the chute must be stopped by closure or restriction of at least the larger of the bleed ports, that one past the sealing ring 3.

Figure 5:
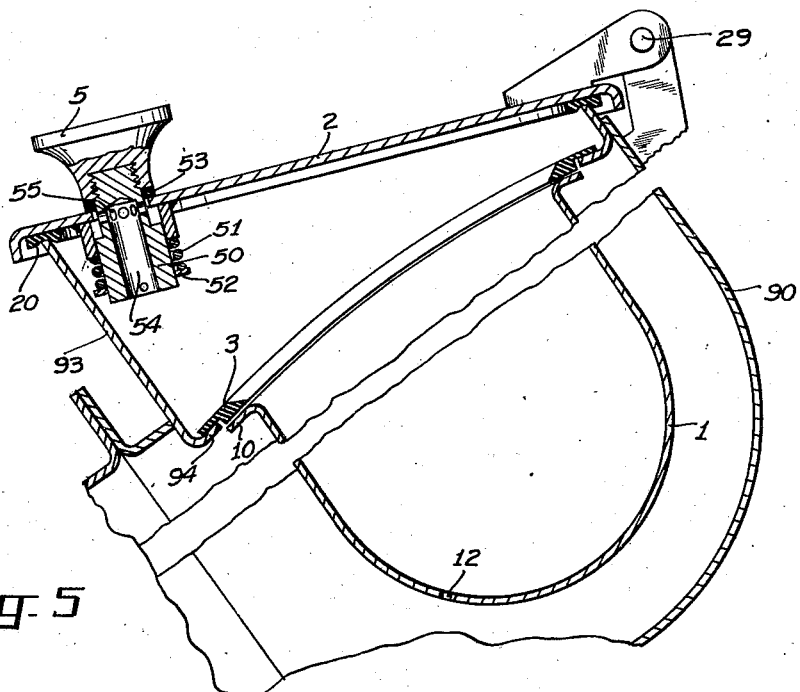
Figure 5 is a view similar to Figure 1 on an enlarged scale, and with parts broken away, illustrating the mechanism in the normal condition.

Preferably means for pressure equalization are incorporated in or associated with the door 2, and more particularly with the door knob or handle 5. This knob, carrying a stem 50, has a reduced portion guided within an aperture in the door 2. A compression spring 51, reacting between the flange 52 on the stem 50 and the inside of the door, tends to press the knob 5 towards the door, and a sealing ring 53 constitutes a seal, to prevent communication through the bore 54 of the stem 50 and the valve openings 55 in the stem's reduced portion. There is, therefore, no pressure leakage from the cabin, under normal circumstances. This condition of parts is shown in Figure 5.

Figure 6:
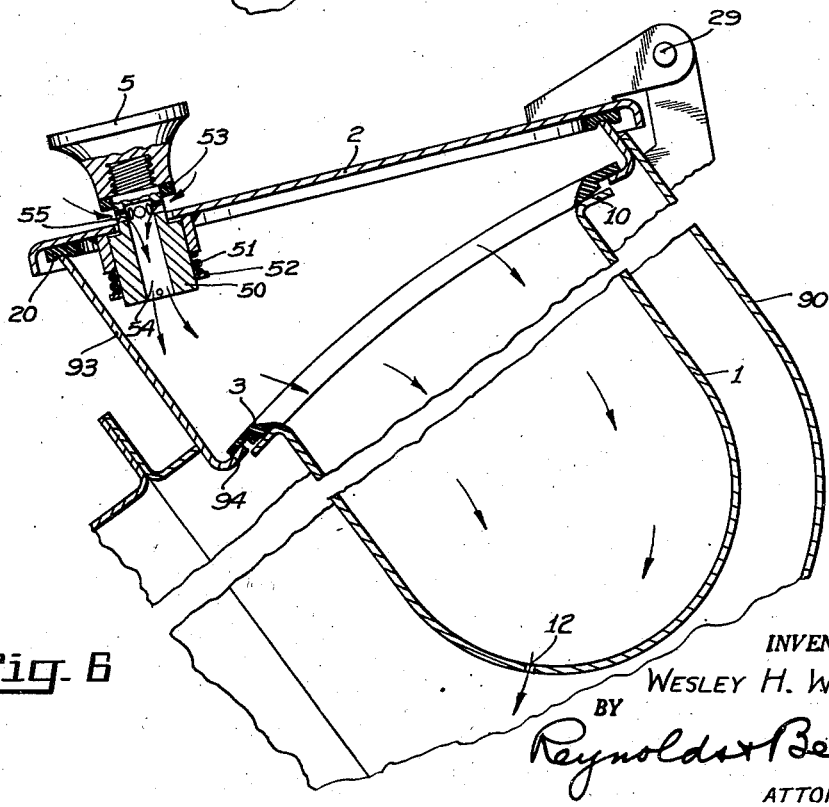
Figure 6 is a similar view, showing parts in the position they would occupy preparatory to opening the door for admission of a flare to the chute.

When it is desired to insert a flare, however, the crew member pulls upwardly on the knob 5, in the manner indicated in Figure 6, as he would do if he were to attempt to open the door 2. Because of the pressure difference on the opposite sides of the door, he cannot immediately open the door, but the cabin pressure is placed in substantially free communication with the interior of the chute by the raising of the knob and the communication of the holes 55 with the cabin interior. Air under pressure from the cabin interior rushes into the chute, and since the communication between the chute and the exterior atmosphere is restricted, pressure tends to build up in the chute more rapidly than it can leak therefrom. This superiority of pressure within the chute then acts on the feathered interior edge of the sealing ring 3, to press it downwardly against the lip 10, in the manner indicated in Figure 6, and when this occurs, the restricted outlet from the chute to the atmosphere is much more greatly restricted, and the communication thereafter is only through the small bleed port 12. It follows that the pressure within the chute and the cabin interior are quickly substantially equalized, and remain so, and immediately upon such equalization the pull upon the knob 5 results in opening the door 2. The crew man has merely pulled on the knob, and in effect has opened the door, but as a prelude to opening the door he has automatically effected equalization of pressure in the two spaces.

Now with the door open, a flare can be admitted to the chute, and the door is closed. Immediately the knob 5 is released, the pressure, leaking out through the bleed port 12, almost immediately drops to a value where the inherent stiffness of the sealing ring 3 withdraws it from the lip 10, and thereupon pressure is substantially instantaneously equalized between the interior of the chute and the exterior atmosphere. The sealing ring 3 no longer impedes swinging movement of the chute, as it did when it was seated upon the lip 10, whereupon, by flexing the handle 4 to disengage it from the notch 41, the chute may be swung outwardly and downwardly, to discharge the flare. Thereupon the chute is swung back into its recess, closing the fairing 91 behind it, and it is ready for reception of the next flare.

There results from the operation of this flare releasing mechanism negligible loss of cabin pressure, and yet the crew member operating the flare release need exert no particular effort to overcome pressure differences. The release of such a flare in this manner proceeds in much the same manner it would were the cabin not pressurized, and yet the pressure is properly maintained.

I claim as my invention:

1. In combination with the pressure-retaining wall of a pressurized aircraft cabin, having a hole for the passage of flares or the like, a chute mounted exteriorly of said wall, and located to receive flares through said hole from within the cabin's interior, and arranged for discharge of said flares, a door normally closing said hole to close off communication between the chute and the pressurized cabin interior, a bleed port for pressure equalization between the chute's interior and the exterior atmosphere, and means to place the interior of the chute in communication with the pressurized cabin, for substantial equalization of pressure, preparatory to opening said door for loading a flare into said chute.

2. The combination of claim 1, including also door-opening means movable in a sense to open the door, and the reverse, the pressure-equalizing means as between the cabin interior and the chute being operatively associated with said door-opening means, and organized and arranged to establish automatically substantially free communication between the cabin interior and the chute by initial movement of the door-opening means in the door-opening sense, as a prelude to opening of the door.

3. The combination of claim 1, including check-valve-like means governing the bleed port, normally biased to remain open, but arranged to close automatically under the influence of a pressure within the chute superior to the ambient external pressure, to restrict leakage from the chute, and thereby permitting opening of the door.

4. In combination with the pressure-retaining wall of a pressurized aircraft cabin, having a hole for the passage of flares or the like, a chute mounted exteriorly of said wall, in position to receive flares through said hole from within the cabin's interior and also arranged for discharge of said flares, a bleed port normally open for communication between the chute's interior and the external atmosphere, a door normally closing said hole, a door handle, and valve means biased to close, operatively associated with the door handle, and operable by movement of the door handle in the door-opening sense to open and establish communication between the cabin's interior and the chute's interior, said valve means being of capacity materially in excess of the capacity of said bleed port.

5. The combination of claim 4, including also check-valve-like means biased to remain open, arranged to govern the bleed port, and to be closed by pressure within the chute which is markedly superior to external atmospheric pressure, such as occurs upon opening of the valve means which is associated with the door handle.

6. Means for releasing flares or the like from within the pressurized cabin of an aircraft, comprising a flare-receiving chute mounted exteriorly of the cabin, the cabin wall having a hole with which said chute may register, mounting means to tilt said chute from a flare-receiving attitude, in registry with said hole, to a flare-dropping attitude, a door normally closing said hole, and openable from within the cabin to admit to said chute when the latter is in flare-receiving attitude, valve means normally closed but openable at will for placing the interior of said chute in communication with the cabin interior for substantial pressure equalization preparatory to loading a flare into the chute, and said chute having a bleed aperture to the exterior, for pressure equalization preparatory to dropping the flare.

7. Means for releasing flares or the like from within the pressurized cabin of an aircraft, comprising a chute for receiving such flares, mounted exteriorly of the cabin, the cabin wall having a hole with which the chute may register, a door normally closing said hole, but operable to admit to said chute from the cabin interior, means mounting said chute for movement from a flare-receiving position, in registry with said hole, to a flare-dropping position, flexible sealing means surrounding the entrance to said chute, and arranged to close under the influence of super-atmospheric pressure, and to relax under the influence of atmospheric pressure, respectively, within the chute, said chute having a bleed port to the atmosphere, and manually controlled valve means for placing the interior of the chute in communication with the cabin interior, to build up pressure within the chute preparatory to opening said door for admitting a flare.

8. Means for releasing flares or the like from the interior of the pressurized cabin of an aircraft, comprising a chute open at one end only, and having a bleed port communicating between its interior and the exterior atmosphere, means mounting said chute, exteriorly of the pressurized cabin, for movement from a flare-receiving position to a flare-releasing position, an annular flexible sealing ring disposed about the chute's open end, in the flare-receiving position, and arranged to seat thereupon under the influence of super-atmospheric chute pressure, a door normally closing off communication between the cabin and chute interiors, normally closed valve means controlling communication between the cabin and chute interiors, and door-opening means operatively connected to said valve means, to open the latter as a prelude to opening the door.

9. Flare release means as defined and for the purposes set forth in claim 8, wherein the chute mounting means includes a pivot mounting therefor located adjacent its closed end, about which the chute is tiltable between its two positions, and means to tilt the chute about such pivot.

10. Flare release means as defined and for the purposes set forth in claim 8, wherein the chute mounting means includes a pivot mounting therefor located adjacent its closed end, about which the chute is tiltable between its two positions, means to tilt the chute about such pivot, an exterior fairing similarly pivotally mounted in the cabin's skin, enclosing said chute, and means interconnecting the chute and fairing for swinging open of the latter as the chute moves towards flare-releasing position.

11. Means for releasing flares or the like from the interior of the pressurized cabin of an aircraft, comprising a chute mounted for shifting from a flare-receiving position to a flare-discharging position, a normally closed door admitting to the chute, when in flare-receiving position, from the pressurized interior, the chute being normally in restricted communication with the exterior atmosphere, means operable to place the chute in communication with the pressurized aircraft interior, as a prelude to opening said door, and means sensitive to super-atmospheric pressure within the chute operable to retain the chute in flare-receiving position until the door is reclosed, and pressure within the chute is restored substantially to atmospheric.

12. Means for releasing flares or the like from the interior of the pressurized cabin of an aircraft, comprising a chute arranged externally of the cabin for the reception and discharge of a flare, and normally in restricted communication with the exterior atmospheric pressure, a normally closed door admitting from the pressurized aircraft interior to the chute, means operable to place the chute in communication with the pressurized interior, for substantial pressure equalization, as a prelude to opening said door and admitting a flare to the chute, and means sensitive to super-atmospheric pressure within the chute to prevent discharge of the flare until said door is reclosed and the chute pressure drops to the vicinity of atmospheric pressure.

13. Flare releasing means as in claim 12, characterized in that the door is mounted to swing inwardly into the pressurized aircraft interior to open, and is held closed by the excess of such interior pressure over atmospheric, and further characterized in that the communication means between the aircraft interior and the chute is formed as a door handle incorporating a normally closed valve slidably mounted in said door, for opening of the valve upon movement of the handle in the direction to open the door.

WESLEY HAROLD WILKES.